Jan. 11, 1972          F. R. KULL          3,634,577
METHOD OF MAKING SELF-LOCKING FASTENERS
Original Filed Jan. 24, 1968
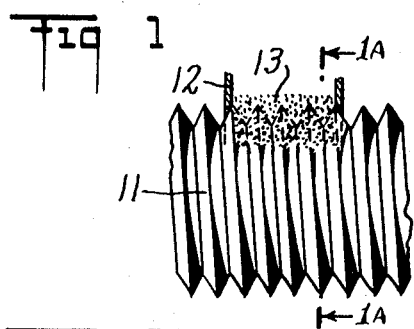
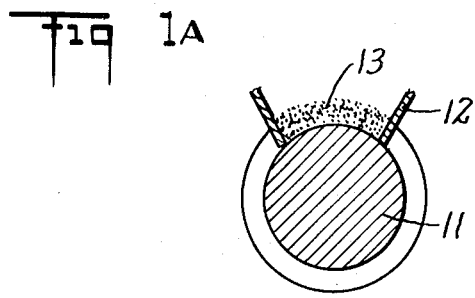
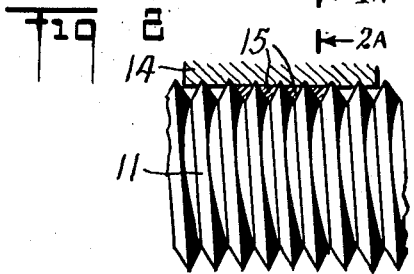
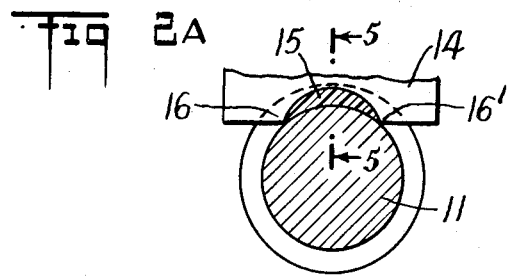
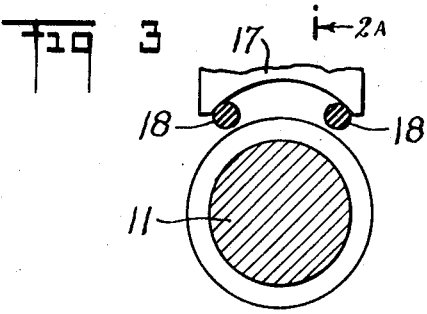
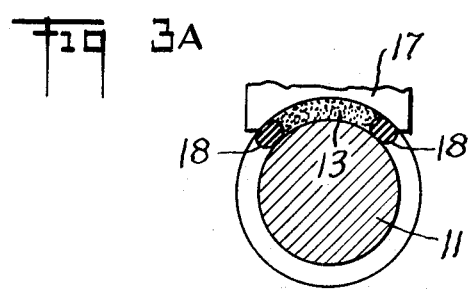
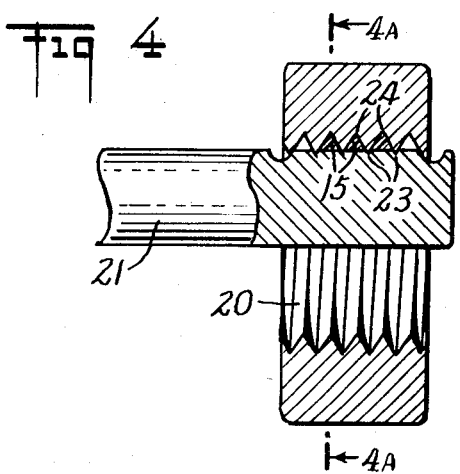
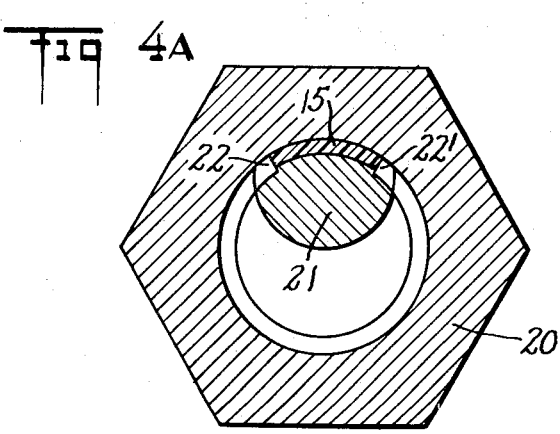
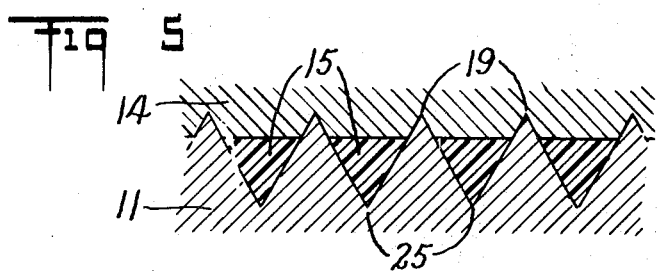
INVENTOR
*Francis R. Kull*
BY *Curtis Morris + Safford*
ATTORNEYS United States Patent Office 3,634,577
Patented Jan. 11, 1972

3,634,577
METHOD OF MAKING SELF-LOCKING
FASTENERS
Francis R. Kull, Warminster, Pa., assignor to Standard
Pressed Steel Co., Jenkintown, Pa.
Continuation of application Ser. No. 700,134, Jan. 24,
1968. This application Apr. 15, 1970, Ser. No. 28,205
Int. Cl. B29d 3/00
U.S. Cl. 264—267                                6 Claims

ABSTRACT OF THE DISCLOSURE

Method of making a plastic patch locking element on a metal fastener by fusing powdered plastic on a surface of the fastener while constraining free flow of the fused plastic to an area within which said locking element is to be formed.

---

This application is a continuation of application Ser. No. 700,134 filed Jan. 24, 1968, now abandoned.

The present invention relates to a method of making self-locking fasteners, and relates in particular to a method of making such fasteners by forming and adhering a plastic locking element in situ on a metal fastener.

Preziosi patent U.S. 3,294,139 discloses self-locking fasteners comprising a plastic locking element formed on the surface of a threaded metal fastener such as a nut or bolt by disposing powdered plastic on the threaded surface of the fastener and heating, causing the plastic to melt and create a free-form liquid pool which substantially retains this shape on cooling.

Although powdered plastics are useful in the formation of locking elements, their employment in the manner taught in the prior art has serious disadvantages. In particular, emphasis is placed in the Preziosi patent on the need for the formation of a free-form liquid pool of fused plastic on a metal fastener surface. However, it has been found that this does not always result in the formation of a uniform plastic patch on a metal fastener surface. Because of incomplete fusion, surface tension effects, and the like, the distribution of a free-form pool of plastic in the threads of a metal fastener such as a nut or bolt is often uneven so that certain portions of a plastic locking element made in this fashion may be excessively thick while other portions are unsatisfactorily thin. Particularly, if there has not been good distribution of the plastic in the thread roots of a threaded fastener, portions of the plastic patch may extend excessively above the thread crests. When such a fastener is put into service, unusual stresses are exerted on the patch and may bring about loosening or dislodging of the patch. These stresses, for example, exerted on particularly thick portions of the plastic patch, can be transmitted to other portions which are attenuated because of poor distribution of the plastic by free flow. Because the latter, thin, portions have the poorest adherence to the metal substrate, they may loosen and tear, often causing the entire locking element of such a prior art fastener to fail.

The present invention discloses a method for employing plastic powders in forming locking elements on metal fasteners in which the disadvantages of prior art processes using powdered plastics are avoided. According to the present invention, powdered plastic is applied to the surface of a metal fastener. The plastic is then heated to fusion and cooled to cause adherence of the plastic to the metal surface while the plastic is confined or constrained in a mold or die restraining the fugacious tendencies of the plastic and promoting an even distribution of the plastic throughout the locking element being formed.

A better understanding of the present invention and of its many advantages will be had by reference to the following drawings, in which:

FIG. 1 and 1A are respectively side and end views, the former partly in section and the latter in section taken along line 1A—1A of FIG. 1, illustrating means for depositing and positioning a measured quantity of a powdered plastic on the surface of a metal fastener;

FIGS. 2 and 2A are respectively side and end views, the former partly in section and the latter in section along line 2A—2A of FIG. 2 of a mold or die engaging a metal fastener having plastic on a surface thereof for constraining the plastic during fusion thereof to form a plastic locking element;

FIGS. 3 and 3A are both end sectional views of another embodiment of a mold or die engaging with a metal fastener having plastic on a surface thereof for constraining the plastic during fusion thereof to form a plastic locking element;

FIGS. 4 and 4A are respectively side and end sectional views, the latter taken along line 4A—4A of FIG. 4, showing still another embodiment of a mold or die engaging with a metal fastener, in which embodiment powdered plastic is present on said mold or die prior to contact thereof with a fastener surface; and FIG. 5 is a side view in section, taken along line 5—5 of FIG. 2A, showing an enlarged portion of the engaged die and fastener of FIGS. 2 and 2A.

FIGS. 1 and 1A each show fastener 11, depicted as a threaded male fastener such as a metal bolt, and hopper arrangement 12 for depositing a fixed quantity of powdered plastic 13 on a selected area of fastener 11. By appropriately shaping hopper 12 and controlling the quantity of plastic 13 dispensed thereby, a charge of powdered plastic of a desired shape and mass may be deposited on fastener 11 and distributed along the length and circumference of the fastener as desired.

As shown in FIGS. 2 and 2A, for formation of a plastic locking element on metal fastener 11 from the powder charge deposited thereon, the fastener and plastic charge are brought into engagement with matching mold or die 14. The powdered plastic deposited on fastener 11 is brought to fusion temperatures and forms body 15 of fluid plastic. As shown particularly in FIG. 2A, die 14 restricts the circumferential flow of plastic 15 between certain longitudinal lines on the circumference of fastener 11, which lines include those points such as 16 and 16' at which die 14 and fastener 11 come to direct contact along all or part of their length. These lines determine the width of the locking element formed on the fastener: in the arc defined between the lines plastic 15 is free to flow circumferentially in the thread roots of fastener 11. By controlling the amount of powdered plastic used to form a locking element patch, the length of the plastic patch formed on fusing the powder can be fixed.

As is particularly evident from FIGS. 2 and 5 of the drawings, die 14 is preferably threaded to engage thread crests 19 of fastener 11 but lacks thread crests which would otherwise engage thread roots 25 of fastener 11. In this manner, accumulation of molten plastic 15 in thread roots 25 of fastener 11 is permitted. A die of this sort is made by forming a keyway or slot of a width equal to the width of the locking element desired into a threaded member matching fastener 11, as particularly suggested in FIG. 2A of the drawings.

FIGS. 3 and 3A show another embodiment of a mold or die for constraining fused plastic at the surface of a fastener such as a threaded metal bolt. In particular, mold or die 17 is unthreaded and is provided with longitudinal strips 18 of a resilient deformable substance such as a silicone rubber. As particularly shown in FIG. 3A, die 17 is pressed into contact with fastener 11 to deform resilient strips 18 and to force them into the thread roots of fastener 11, confining plastic powder 13 in the cavity formed by die 17, fastener 11, and strips 18. On fusion, plastic 13 is confined on fastener 11 in an area in which the formation of a plastic patch locking element is desired. This embodiment has the advantage that no particular alignment of die 17 and fastener 11 relative to each other is required, as is true of the use of threaded dies which must engage with corresponding threaded portions of a fastener.

FIGS. 4 and 4A show another metal fastener 20, in this case a threaded female fastener such as an interiorly threaded metal nut, and mold or die 21 engaged therewith and in direct contact with nut 20 at points such as 22 and 22′ defining lines of contact within the threaded portion of nut 20. Between these lines, die 21 is suitably threaded to engage with thread crests 23 of nut 20, but not with thread roots 24. Again, a volume is defined for a restrained or confined flow of molten plastic 15.

In the embodiment shown in FIGS. 4 and 4A, a suitably shaped measured quantity of powdered plastic is conveniently deposited on the surface of die 21 prior to its engagement with fastener 20, rather than on the fastener surface. This technique is particularly useful with female fasteners because of often difficult access to their interior surfaces.

To effect fusion of a powdered plastic for cohering and adhering the plastic to the surface of a metal fastener, either the constraining mold or die, or the fastener, or both, may be heated to a temperature sufficient to fuse the plastic powder. The heating of one or both metal parts by radio frequency induction heating is suitable, for example. It is particularly convenient to heat at least the constraining mold or die, since the mass of fastener metal is generally smaller than the die mass and the fastener, if unheated, does not act as an inconveniently large heat sink.

The pressure applied in engaging a die and fastener need be only that sufficient to cause mating of the parts to define the cavity within which the fluid fused plastic flows and is confined. The application of pressure to unfused plastic may aid in the process of fusion.

Contact between the die and the fastener is maintained after termination of the heating cycle until the fluid plastic has cooled sufficiently to lose its fluidity. To prevent adhesion of the formed plastic locking patch to the mold or die employed, the latter may be provided with a coating or film of a material to which the plastic is non-adherent or may be of a metal different from the metal of the fastener and to which the plastic used in the patch does not easily adhere.

What is claimed is:

1. The method of forming a plastic patch locking element on a portion of the circumference of a threaded surface of a metal fastener which comprises melting a body of powdered plastic on said threaded surface while constraining free flow of the molten plastic to an area on the circumference of said threaded surface on which said locking element is to be formed by engaging said fastener with a die to which said plastic does not easily adhere, said die engaging thread crests of said fastener but permitting a constrained flow of molten plastic in thread roots of said fastener within the area in which said locking element is to be formed, and then cooling and solidifying said molten plastic.

2. The method as in claim 1 wherein a plastic patch locking element is formed on a threaded surface of a threaded male fastener.

3. The method as in claim 1 wherein a plastic patch locking element is formed on a threaded surface of a threaded female fastener.

4. The method as in claim 1 wherein said powdered plastic is applied to said fastener prior to engaging said die and fastener.

5. The method as in claim 1 wherein said powdered plastic is applied to said die prior to engaging said die and fastener.

6. The method as in claim 1 wherein pressure is applied to said molten plastic before said molten plastic is cooled and solidified.

References Cited

UNITED STATES PATENTS

| 2,286,336 | 6/1942 | Brooke | 264—269 X |
| 2,579,951 | 12/1951 | Morin et al. | 264—275 X |
| 2,999,276 | 9/1961 | Morin | 264—275 X |
| 3,018,519 | 1/1962 | Morin et al. | 264—269 X |
| 3,187,074 | 6/1965 | Morin | 264—161 X |
| 3,294,139 | 12/1966 | Preziosi | 151—7 |
| 3,316,338 | 4/1967 | Rieke | 151—7 X |

ROBERT F. WHITE, Primary Examiner

A. M. SOKAL, Assistant Examiner

U.S. Cl. X.R.

151—7; 264—274, 275